(No Model.)

H. FREDRICK.
ROTARY WATER METER.

No. 316,614. Patented Apr. 28, 1885.

WITNESSES:
A. Schehl
Carl Kay

INVENTOR
Henry Fredrick
BY Goepel & Raegener
ATTORNEYS.

(No Model.)  2 Sheets—Sheet 2.

H. FREDRICK.
ROTARY WATER METER.

No. 316,614. Patented Apr. 28, 1885.

WITNESSES:
A. Schehl.
Carl Karp

INVENTOR
Henry Fredrick
BY Gospel & Raegener
ATTORNEYS.

UNITED STATES PATENT OFFICE.

HENRY FREDRICK, OF NEWARK, NEW JERSEY.

ROTARY WATER-METER.

SPECIFICATION forming part of Letters Patent No. 316,614, dated April 28, 1885.

Application filed January 26, 1885. (No model.)

*To all whom it may concern:*

Be it known that I, HENRY FREDRICK, of Newark, in the county of Essex and State of New Jersey, have invented certain new and useful Improvements in Rotary Meters, of which the following is a specification.

This invention has reference to certain improvements in the rotary meter for which Letters Patent have been granted to me, No. 287,529, and dated October 30, 1883, the improvements being designed with a view to increase the accuracy of the meter, protect it against choking by impurities carried along in the water, adjust the same to different water-pressures, and provide in a more efficient manner against the wearing out of the movable parts of the meter.

The invention consists of a rotary meter the casing of which is divided by a horizontal partition-wall into two chambers, an admission-chamber and an upper or wheel chamber. The lower chamber is provided with an admission-pipe, above the discharge-opening of which an adjustable diaphragm is arranged, by which the flow of the water can be regulated. A detachable cup-shaped bottom of the lower chamber serves for collecting and removing the sediments. The horizontal partition is provided with a tubular journal, which is covered at the lower end by a screen that prevents impurities from passing through the same. The screen is held in position by a downwardly-projecting flange of the diaphragm and a shoulder of the lower part of the casing. On the tubular journal rotates a rotary water-wheel having curved and tapering tubular arms that are beveled at their convex edges, so as to pass more easily through the water. The water-wheel rests by its hub on the tubular journal and rotates within a fixed circular abutment having teeth. The upper edge of the tubular journal is provided with a raised rim, on which the hub of the water-wheel rests, the flanged lower edge of which is guided by fixed lugs attached to a flange of the tubular journal. In larger meters the water-wheel is inclosed by a sheet-metal casing, which acts as a float to reduce the weight of the wheel.

Figure 1:
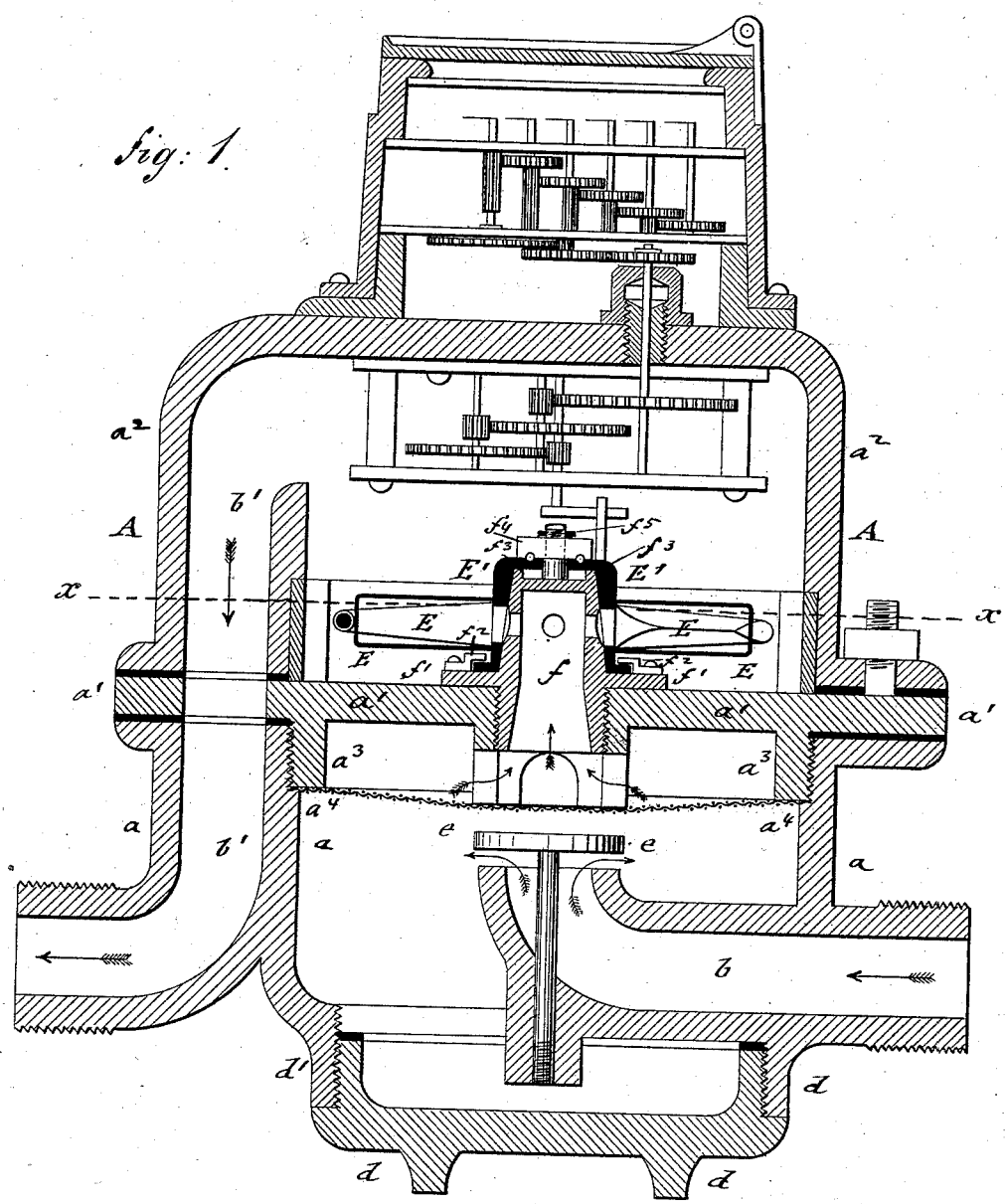
Figure 2:
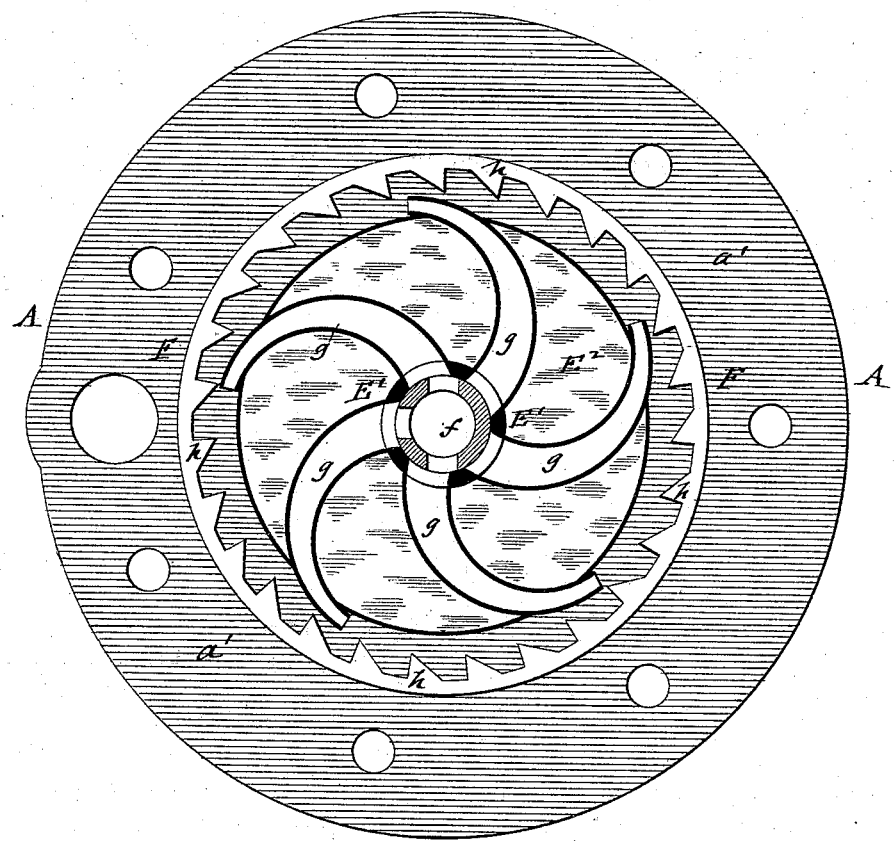
Figure 3:
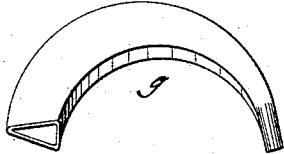

In the accompanying drawings, Figure 1 represents a vertical central section of my improved rotary meter. Fig. 2 is a horizontal section of the same on line $x\ x$, Fig. 1; and Fig. 3 is a perspective view of one of the curved arms of the water-wheel used in my improved water-meter.

Similar letters of reference indicate corresponding parts.

Referring to the drawings, A represents the casing of my improved rotary meter, which is composed of three parts—a lower section, $a$, that forms the admission-chamber, a horizontal partition, $a'$, and an upper section, $a^2$, forming the wheel-chamber. The flanged sections $a\ a^2$ and the partition $a'$ are screwed tightly together by means of bolts and nuts, and prevented from leaking by interposed packing, as shown in Fig. 1. The lower section, $a$, is provided with an admission-pipe, $b$, which is connected by a suitable coupling to a valved supply-pipe. (Not shown in the drawings.) The upper section, $a^2$, of the casing is connected with the discharge-pipe $b'$, which latter is preferably cast integral with sections $a\ a^2$.

The lower section, $a$, of the casing A is provided with a detachable bottom, $d$, which is screwed up against an annular collar, $d'$, said bottom being made cup-shaped so as to serve as a pan for collecting sediments or removing them from time to time by unscrewing the bottom $d$. The end of the admission-pipe $b$ is bent in upward direction, and provided at some distance from its opening with a diaphragm, $e$, the stem of which passes through a perforated boss of the pipe, and is adjusted by its lower threaded end higher or lower above the mouth of the supply-pipe. By setting the diaphragm to a greater or smaller distance from the discharge end of the supply-pipe $b$ the admission of water into the meter can be regulated, so that a more uniform working of the meter is secured.

The lower section, $a$, of the casing A is screwed up against a shoulder, $a^3$, of the horizontal partition $a'$. A screen, D, is held in position below the partition by the shoulder $a^3$ of the same and a shoulder, $a^4$, of the lower section, $a$. The partition $a'$ has a central opening, into which is screwed a tubular journal, $f$, until its flange $f'$ abuts against the partition $a'$. A water-wheel, E, is applied by its hub E' to the journal f'. The water passes through the screen and tubular journal f and through lateral openings of the same into the curved radial arms of the water-wheel. The screen prevents the passage of impurities to the water-wheel, whereby the regular motion of the same would be interrupted. The screen is from time to time removed for cleaning and replaced by a new one, if necessary, which is accomplished by detaching the upper section of the casing and the partition.

To the flange $f'$ of the journal $f$ are attached lugs $f^2$, that retain the bottom flange of the hub E', as shown in Fig. 1. The upper end of the tubular journal $f$ is provided with a raised rim, $f^3$, on which rests the hub E', so as to diminish the friction with the journal. The hub is retained on the top of the journal by a screw-nut, $f^4$, which is screwed on the short central shaft of the journal and retained by a transverse pin, $f^5$. The bottom surface of the nut $f^4$ and the top surface of the hub C are provided with an annular groove, one vertically above the other, in which grooves are placed small anti-friction balls, as shown in Fig. 1, by which the friction between the hub and the screw-nut $f^4$ is reduced.

The curved tubular arms $g$ of the water-wheel E are made tapering toward the ends, are also beveled toward their convex edge, so that they pass with less friction through the water, as shown in Fig. 3.

For large sizes of meters, the tubular arms $g$ are inclosed by a sheet-metal shell, $E^2$, that is soldered together, so as to form a casing or float for the water-wheel, whereby the weight of the same is counterbalanced and the wheel made more sensitive to the flow of water through the arms. The water-wheel F is encircled by an annular abutment, F, that is provided with inwardly-projecting teeth $h$, against which the water on its exit from the water-wheel is thrown, so as to cause a reaction upon the arms and turn them even with a slight pressure of water thereon. The teeth $h$ are preferably cast integral with the abutment F, and the same set into a recess of the wheel-casing, as shown in Fig. 1.

The hub E' of the rotating water-wheel E is provided with an upwardly-extending crank-pin, that engages an arm of a crank-shaft which sets a train of gear-wheels in motion. A shaft of one of the wheels passes through a stuffing-box of the upper section, $a^2$, to the register or counter by which the revolutions of the water-wheel are registered.

The transmitting-wheels and register may be made of any approved construction, as they form no part of my invention.

By the construction described the water is supplied to the meter without any mechanical impurities which might choke or clog the action of the water-wheel. The sediments are easily removed from time to time as required, and the normal water-pressure required for the working of the meter secured by the adjustable diaphragm at the inner opening of the supply-pipe.

By the construction of the arms and inclosing-shell of the water-wheel the same is rendered more sensitive, so as to register even small quantities of water. It is rendered more effective by the toothed abutment.

The meter is made up in different sizes, according to the quantity of water to be measured, and forms a reliable means of registering and regulating the water passing through the same.

Having thus described my invention, I claim as new and desire to secure by Letters Patent—

1. In a water-meter, a casing consisting of a lower section having a supply-pipe and a detachable bottom, a horizontal partition, and an upper section or wheel-chamber provided with a discharge-pipe, substantially as set forth.

2. The combination, in a water-meter, of a casing having a supply-pipe at the lower part with a vertically-adjustable diaphragm arranged above the discharge end of the supply-pipe, substantially as set forth.

3. The combination, in a water-meter, of a casing having a lower section, a supply-pipe, and a diaphragm above said supply-pipe, a horizontal partition having a tubular journal, a water-wheel turning on said journal, and a screen located below the tubular journal, substantially as set forth.

4. In a water-meter, the combination of a tubular journal having discharge-openings, a circumferential flange with guide-lugs, and a raised rim at the upper end with a water-wheel the hub of which is retained on the journal, substantially as set forth.

5. In a water-meter, a water-wheel having curved tubular arms tapering toward the ends, beveled toward their convex edge, so as to reduce the friction with the water, substantially as set forth.

6. The combination, in a water-meter, of a casing, a horizontal partition, a tubular journal, a water-wheel having curved and tapering arms, and a metallic shell inclosing the arms of the water-wheel, substantially as set forth.

7. The combination of a casing consisting of a lower supply-chamber, a partition, and an upper or wheel chamber, a tubular journal attached to the partition, a screen below the lower end of the journal, a water-wheel having curved and tapering arms, and a circular abutment surrounding the water-wheel and having inwardly-projecting teeth, substantially as set forth.

In testimony that I claim the foregoing as my invention I have signed my name in presence of two subscribing witnesses.

HENRY FREDRICK.

Witnesses:
 PAUL GOEPEL,
 W. LITTMANN.